(12) United States Patent
VanDerWege

(10) Patent No.: US 10,107,182 B2
(45) Date of Patent: Oct. 23, 2018

(54) METHOD AND SYSTEM FOR IMPROVING TURBOCHARGER EFFICIENCY

(71) Applicant: Ford Global Technologies, LLC, Dearborn, MI (US)

(72) Inventor: Brad Alan VanDerWege, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/702,976

(22) Filed: Sep. 13, 2017

(65) Prior Publication Data

US 2018/0003102 A1 Jan. 4, 2018

Related U.S. Application Data

(62) Division of application No. 14/516,324, filed on Oct. 16, 2014.

(51) Int. Cl.

| | |
|---|---|
| *F02D 23/00* | (2006.01) |
| *F02B 37/02* | (2006.01) |
| *F02B 37/12* | (2006.01) |
| *F02D 17/02* | (2006.01) |
| *F02D 41/00* | (2006.01) |
| *F02D 13/06* | (2006.01) |

(52) U.S. Cl.
CPC ............ *F02B 37/025* (2013.01); *F02B 37/12* (2013.01); *F02D 17/02* (2013.01); *F02D 41/0007* (2013.01); *F02D 41/0087* (2013.01); *F02D 13/06* (2013.01); *F02D 2041/0012* (2013.01); *Y02T 10/144* (2013.01)

(58) Field of Classification Search
CPC .... F02B 37/001; F02B 37/004; F02B 37/007; F02B 37/013; F02D 41/0087
USPC ............................................. 60/612; 123/562
See application file for complete search history.

(56) References Cited

U.S. PATENT DOCUMENTS

| | | | |
|---|---|---|---|
| 4,179,892 A | 12/1979 | Heydrich | |
| 4,719,757 A | 1/1988 | Nakazawa et al. | |
| 4,903,489 A * | 2/1990 | Ruetz | F02B 33/446 60/612 |
| 7,555,896 B2 | 7/2009 | Lewis et al. | |
| 8,359,858 B2 | 1/2013 | Pursifull | |
| 8,397,499 B2 * | 3/2013 | Doering | F02D 41/0007 123/562 |
| 8,402,942 B2 | 3/2013 | Tripathi et al. | |
| 8,434,306 B2 * | 5/2013 | Robinson | F02M 35/10163 123/562 |
| 8,459,026 B2 | 6/2013 | Matthews et al. | |
| 8,651,091 B2 | 2/2014 | Tripathi et al. | |
| 8,833,058 B2 | 9/2014 | Ervin et al. | |
| 8,881,713 B2 | 11/2014 | Surnilla et al. | |
| 9,051,871 B1 | 6/2015 | Wu et al. | |
| 9,284,898 B2 | 3/2016 | Buckland et al. | |

(Continued)

*Primary Examiner* — Ngoc T Nguyen
(74) *Attorney, Agent, or Firm* — Julia Voutyras; McCoy Russell LLP

(57) ABSTRACT

Methods and systems are provided for enhancing turbocharger performance for a boosted engine system configured to operate with a pattern of deactivated cylinders. In one example, a method may include, in response to a demand for boost, operating with a cylinder pattern based on boost demand and turbocharger configuration. The specific pattern may depend on the pattern constraints imposed by engine load and NVH metrics.

10 Claims, 8 Drawing Sheets

(56) References Cited

U.S. PATENT DOCUMENTS

| | | |
|---|---|---|
| 2004/0099242 A1 | 5/2004 | Wu et al. |
| 2007/0074513 A1* | 4/2007 | Lamb ................... F01N 13/107 60/612 |
| 2010/0078001 A1* | 4/2010 | Kolmanovsky ........... F01L 9/04 123/676 |
| 2012/0227714 A1 | 9/2012 | Surnilla et al. |
| 2012/0285161 A1* | 11/2012 | Kerns ................. F02D 41/0087 60/598 |
| 2013/0167528 A1* | 7/2013 | Schlund ................ F02M 25/07 60/612 |
| 2013/0195639 A1 | 8/2013 | Serres et al. |
| 2014/0331667 A1 | 11/2014 | Kindl et al. |
| 2014/0352300 A1 | 12/2014 | Keating |
| 2017/0002772 A1* | 1/2017 | Perfetto ................ F02M 26/09 |
| 2017/0260916 A1* | 9/2017 | Kraemer ............ F02D 41/0007 |

\* cited by examiner

Multi-scroll turbine

Twin-turbo, connected compressor outlets

Twin-turbo, isolated compressor outlets

METHOD AND SYSTEM FOR IMPROVING TURBOCHARGER EFFICIENCY

CROSS REFERENCE TO RELATED APPLICATION

The present application is a divisional of U.S. patent application Ser. No. 14/516,324, entitled "METHOD AND SYSTEM FOR IMPROVING TURBOCHARGER EFFICIENCY," filed on Oct. 16, 2014. The entire contents of the above-referenced application are hereby incorporated by reference in its entirety for all purposes.

FIELD

The present application relates to methods and systems for optimizing turbocharger performance in a boosted engine system configured to operate with a pattern of active and deactivated combustion cylinders.

BACKGROUND AND SUMMARY

Engines may be configured to operate with a variable number of active or deactivated cylinders to increase fuel economy, while optionally maintaining the overall exhaust mixture air-fuel ratio about stoichiometry. Such engines are known as variable displacement engines (VDE). Therein, a portion of an engine's cylinders may be disabled during selected conditions defined by parameters such as a speed/load window, as well as various other operating conditions including vehicle speed. A VDE control system may disable a selected group of cylinders, such as a bank of cylinders, through the control of a plurality of cylinder valve deactivators that affect the operation of the cylinder's intake and exhaust valves, or through the control of a plurality of selectively deactivatable fuel injectors that affect cylinder fueling.

Further improvements in fuel economy can be achieved in engines configured to vary the effective displacement of the engine by skipping the delivery of fuel to certain cylinders in an indexed cylinder firing pattern, also referred to as a "skip-fire" pattern. One example of a skip-fire engine is shown by Tripathi et al. in U.S. Pat. No. 8,651,091. Therein, an engine fuel controller may continuously rotate which particular cylinders are fueled, which cylinders are skipped, and how many cylinder events the pattern is continued for. By skipping fuel delivery to selected cylinders, the active cylinders can be operated near their optimum efficiency, increasing the overall operating efficiency of the engine. By varying the identity and number of cylinders skipped, a large range of engine displacement options may be possible.

However the inventors herein have identified potential issues with such engine systems Specifically, in the case of a boosted engine, turbocharger performance may be degraded when one or more cylinders are deactivated. This is because the distribution and frequency of exhaust pulses released from the active engine cylinders may affect the efficiency of the turbine(s). In addition, the reduced exhaust volume associated with cylinder deactivation may adversely affect turbo charger efficiency. As an example, based on the firing of the active cylinders, exhaust pulses may be directed to different regions of a turbine, or different turbines altogether, resulting in insufficient turbine spin-up and increased turbo lag. Consequently, transient performance of the turbocharger may be degraded. Further, the load range for a given cylinder pattern of the selective deactivation may be limited. Further still, long delays between exhaust pulses can allow the turbine to slow down, and potentially go into compressor surge. The inventors herein have recognized that on some engines, there may be some flexibility remaining to further optimize the cylinder pattern in view of turbocharger performance.

In one example, the above issues may be at least partly addressed by a method of operating an engine comprising: in response to a boost demand, selectively deactivating a cylinder pattern of individual cylinder valve mechanisms; the cylinder pattern selected to direct exhaust from active cylinders into one scroll of a multi-scroll exhaust turbine. In alternate examples, the cylinder pattern may be further selected to direct exhaust from active cylinders into one turbine of a multi-turbine engine system (such as a twin-turbo engine system). In this way, a cylinder pattern may be selected during selective cylinder deactivation where the exhaust pulses of the active cylinders improve the turbine response.

As an example, a boosted engine system may include a single twin-scroll turbine. In response to a low engine load condition, an initial set of deactivated cylinder patterns may be selected based on engine load. The selection of cylinder patterns based on engine load may include selecting a number of cylinders to deactivate and a number of cylinders that will continue firing, the number of deactivated cylinders increasing with decreasing engine load. The initial set of patterns may be further modified based on engine NVH constraints, for instance by removing engine patterns which degrade NVH from the initial set. Under some conditions, such as during a boost demand, the modified set of cylinder patterns may be further modified based on their effect on turbine efficiency. This may include selecting a cylinder pattern from the initial set that also improves turbine efficiency, such as by directing exhaust pulses from active cylinders towards only one of the two scrolls of the turbine, for example to only the inner scroll or only the outer scroll. In alternate examples, cylinder patterns that degrade turbine efficiency may be selected out and a remaining cylinder pattern may be applied in the presence of the boost demand. As such, the cylinder pattern selected for improving turbine efficiency may be based on the specific configuration of the boosted engine. Thus, while the depicted example suggests selecting a cylinder pattern that directs exhaust pulses of active cylinders to a single scroll, in embodiments where the engine has multiple turbines, a cylinder pattern may be selected that directs exhaust pulses to a single turbine. In this way, during cylinder deactivation conditions where boost is requested, a cylinder pattern of deactivated/active cylinders may be selected, whenever possible, to improve turbine performance. By choosing a cylinder pattern wherein the distribution and frequency of exhaust pulses from the active cylinders are advantageously used to improve turbocharger performance, enhanced boost performance may be achieved along with cylinder deactivation benefits. For example, by selectively directing exhaust pulses from the active cylinders towards a single turbine, or a single turbine scroll, sufficient exhaust may be provided to the selected turbine to enhance turbine operation despite low exhaust volumes. As such, this allows for improved boosted engine performance in low-to-mid loads with cylinders deactivated. Overall, cylinder deactivation benefits, such as improved fuel economy, can be extended to a wider range of boosted engine operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTIONS OF THE DRAWINGS

Methods and systems are provided for adjusting cylinder deactivation patterns in an engine configured for selective cylinder deactivation (herein also referred to as skip-fire operation), such as the engine systems of FIGS. 1-5. A controller may adjust the cylinder pattern of individual cylinder deactivation selected responsive to cylinder deactivation conditions based on boost demand to enhance turbocharger performance of an engine. Example cylinder patterns that may be applied to improve boost response in an in-line 4-cylinder engine and in a V-8 engine are shown at FIG. 6. A controller may be configured to perform a routine, such as the routine of FIG. 7, to select a cylinder pattern, from the example patterns of FIG. 6, to enhance turbocharger performance when cylinders are deactivated while boost is desired. The patterns may be selected based on a specific turbocharger configuration of the engine, as shown at FIGS. 8A-C. In this way, cylinder deactivation benefits may be extended to a wider range of boosted operating conditions, in engines of different boost configurations.

Figure 1:
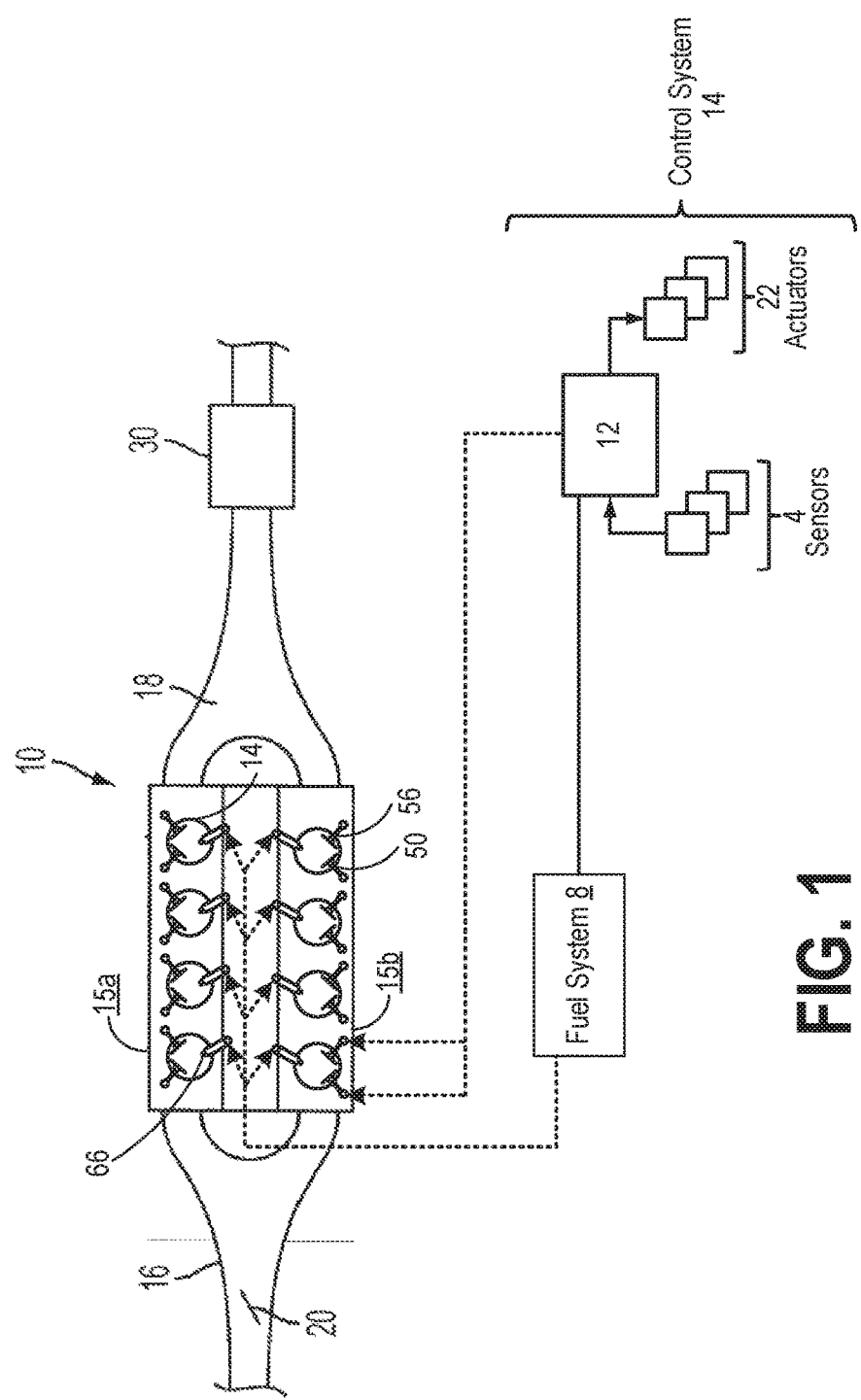
FIG. 1 shows an example embodiment of an engine system layout.

FIG. 1 shows an example engine 10 having a first bank 15a and a second bank 15b. In the depicted example, engine 10 is a V-8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves. During selected conditions, such as when the full torque capability of the engine is not needed, one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by deactivating the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder.

In alternate examples, engine system 10 may have selectively deactivatable fuel injectors and the selected cylinders may be deactivated by shutting off the respective fuel injectors while maintaining operation of the intake and exhaust valves such that air may continue to be pumped through the cylinders.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may be deactivated to provide a specific firing (or skip-firing) pattern based on a designated control algorithm, referred to herein as the cylinder pattern. The cylinder pattern may include a total number of deactivated (or skipped) cylinders relative to active cylinders. More specifically, selected "skipped" cylinders are not fired while other "active" cylinders are fired. Optionally, a spark timing associated with a selected firing of a selected working chamber may also be adjusted based on a firing order or firing history of the selected working chamber. The engine controller 12 may be configured with suitable logic, as described below, for determining a cylinder deactivation (or skip-firing) pattern based on engine operating conditions.

Engine 10 may operate on a plurality of substances, which may be delivered via fuel system 8. Engine 10 may be controlled at least partially by a control system including controller 12. Controller 12 may receive various signals from sensors 4 coupled to engine 10 (and described with reference to FIG. 2), and send control signals to various actuators 22 coupled to the engine and/or vehicle (as described with reference to FIG. 2). The various sensors may include, for example, various temperature, pressure, and air-fuel ratio sensors. In addition, controller 12 may receive an indication of cylinder knock or pre-ignition from one or more knock sensors distributed along the engine block. When included, the plurality of knock sensors may be distributed symmetrically or asymmetrically along the engine block. Further, the one or more knock sensors may include accelerometers, ionization sensors or in cylinder pressure transducers.

Engine controller may include a drive pulse generator and a sequencer for determining a cylinder pattern based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be adjusted. Since optimal efficiency for a given cylinder is near full output, a lower frequency of firing events may be chosen to reduce output. For example, skipping every other cylinder would produce half of the power, on average. Spacing the firing events out as evenly as possible tends to minimize vibrations due to the varying torque output. Whether all of the cylinders are included in the skip-firing pattern may depend on the fraction of output desired, and other considerations including cylinder temperature.

In this way, by adjusting the cylinder pattern of individual cylinder valve mechanisms (or individual cylinder fuel injectors), a desired engine output can be provided by operating fewer cylinders more efficiently, thereby improving fuel economy.

Figure 2:
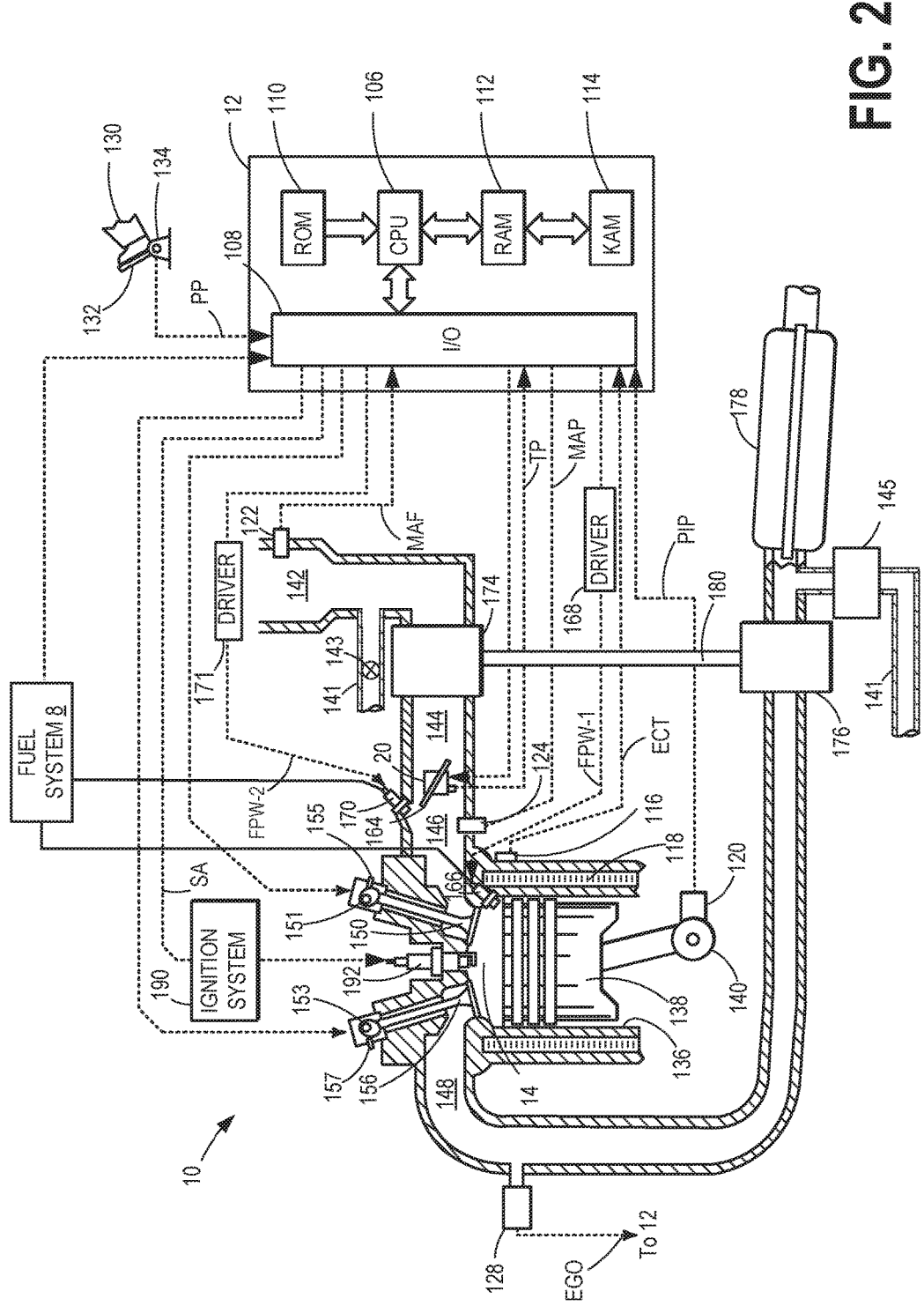
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. A throttle 20 including a throttle plate 164 may be provided along an intake passage of the engine for varying the flow rate and/or pressure of intake air provided to the engine cylinders. For example, throttle 20 may be disposed downstream of compressor 174, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more injectors for delivering fuel to the cylinder. As a non-limiting example, cylinder 14 is shown including two fuel injectors 166 and 170. Fuel injectors 166 and 170 may be configured to deliver fuel received from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 166 and 170, different effects may be achieved.

Fuel may be delivered by both injectors to the cylinder during a single cycle of the cylinder. For example, each injector may deliver a portion of a total fuel injection that is combusted in cylinder 14. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 144 may be varied by controller 12 via EGR valve 143. Further, an EGR sensor 145 may be arranged within the EGR passage and may provide an indication of one or more pressure, temperature, and concentration of the exhaust gas.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

The engine systems of FIGS. 1 and 2 may be operated with a cylinder deactivation pattern that may affect turbocharger performance due to reduced exhaust volumes. A pattern may be selected that optimizes turbocharger performance, and the pattern may differ for different boosted engine systems, such as the engine configurations of FIGS. 3-5. For example, as described below in further detail, the number and characteristics of turbines and the configuration of compressor outlets may affect the pattern that is selected.

Figure 3:
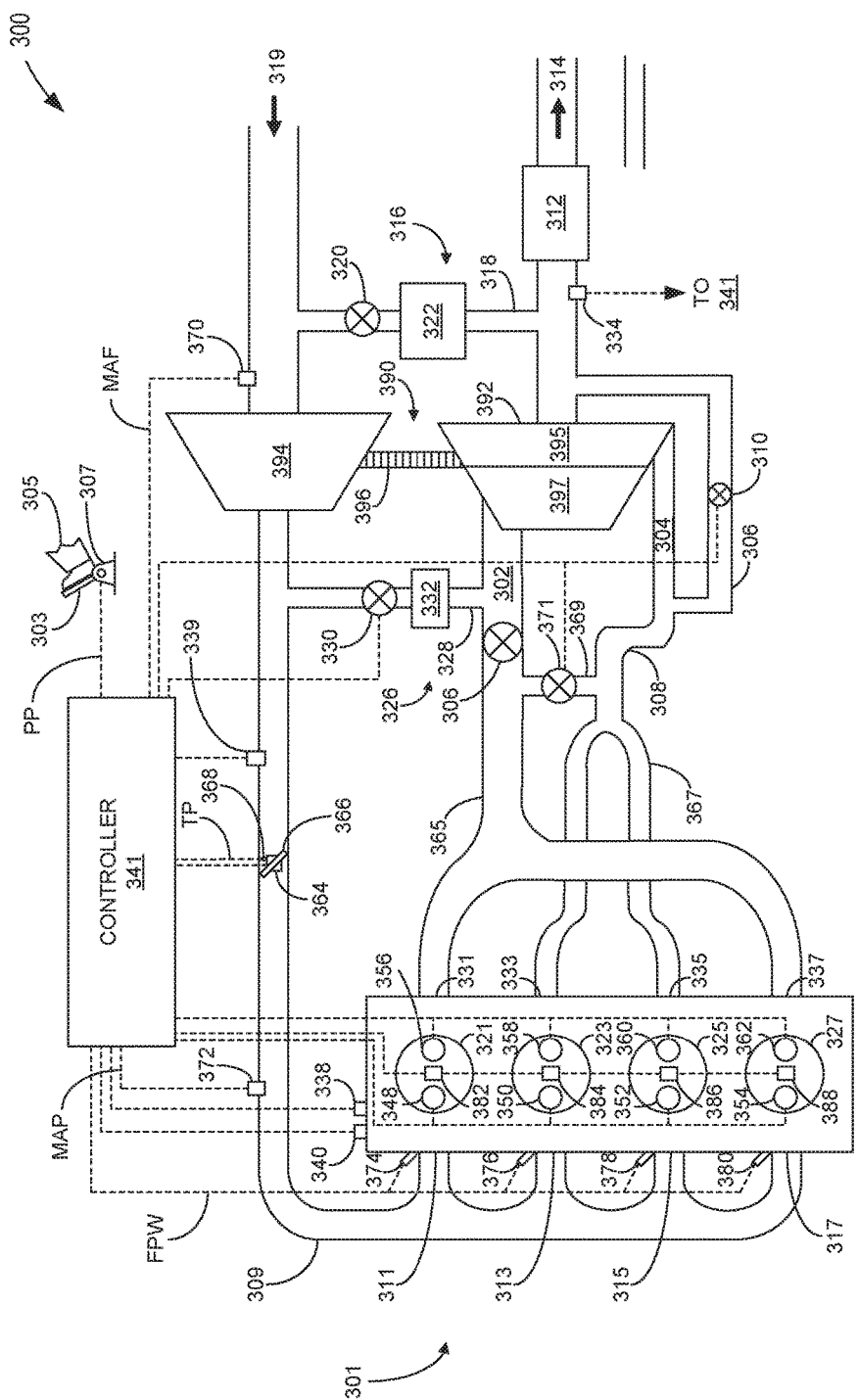
FIG. 3 shows a schematic depiction of a boosted engine system including a binary flow turbine.

FIG. 3 shows a schematic diagram of a boosted engine system 300 including a binary flow or twin-scroll turbine 392, which may be included in a propulsion system of an automobile. Engine 301 may be controlled at least partially by a control system including controller 341 and by input from a vehicle operator 305 via an input device 303. In this example, input device 303 includes an accelerator pedal and a pedal position sensor 307 for generating a proportional pedal position signal PP.

Engine 301 may include a plurality of combustion chambers (i.e., cylinders). In the example shown in FIG. 3, engine 301 includes combustion chambers 321, 323, 325, and 327, arranged in an in-line 4-cylinder configuration. It should be understood, however, that although FIG. 3 shows four cylinders, engine 301 may include any number of cylinders in any configuration, e.g., V-8, V-6, I-6, V-12, opposed 4, etc. FIG. 3 may also represent either of the two banks of a V-8 engine.

Though not shown in FIG. 3, each combustion chamber (i.e., cylinder) of engine 301 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 301.

Each combustion chamber may receive intake air from an intake manifold 309 via an air intake passage 319. Intake manifold 309 may be coupled to the combustion chambers via intake ports. For example, intake manifold 309 is shown in FIG. 3 coupled to cylinders 321, 323, 325, and 327 via intake ports 311, 313, 315, and 317, respectively. Each respective intake port may supply air and/or fuel to the respective cylinder for combustion.

Each combustion chamber may exhaust combustion gases via an exhaust port coupled thereto. For example, exhaust ports 331, 333, 335, 337 are shown in FIG. 3 coupled to cylinders 321, 323, 325, 327, respectively. Each respective exhaust port may direct exhaust combustion gases from a respective cylinder to an exhaust manifold or exhaust passage. In the present example, the exhaust manifold is a divided exhaust manifold wherein exhaust ports of selected cylinders direct exhaust to distinct exhaust manifolds. In the present depiction, exhaust ports 331 and 337 direct exhaust combustion gases of cylinders 321 and 327 to exhaust manifold segment 365 while exhaust ports 333 and 335 direct exhaust combustion gases of cylinders 323 and 325 to exhaust manifold segment 367. In alternate examples, each of exhaust ports 331, 333, 335, 337 may direct exhaust combustion gases from a respective cylinder to a common, undivided exhaust manifold. Each cylinder intake port can selectively communicate with the cylinder via an intake valve. For example, cylinders 321, 323, 325, and 327 are shown in FIG. 3 with intake valves 348, 350, 352, and 354, respectively. Likewise, each cylinder exhaust port can selectively communicate with the cylinder via an exhaust valve. For example, cylinders 321, 323, 325, and 327 are shown in FIG. 3 with exhaust valves 356, 358, 360, and 362, respectively. In some examples, each combustion chamber may include two or more intake valves and/or two or more exhaust valves.

Though not shown in FIG. 3, in some examples, each intake and exhaust valve may be operated by an intake cam and an exhaust cam. Alternatively, one or more of the intake and exhaust valves may be operated by an electromechanically controlled valve coil and armature assembly. The position of an intake cam may be determined by an intake cam sensor. The position of exhaust cam may be determined by an exhaust cam sensor.

Intake passage 319 may include a throttle 364 having a throttle plate 366. In this particular example, the position of throttle plate 366 may be varied by controller 341 via a signal provided to an electric motor or actuator included with throttle 364, a configuration that is commonly referred to as electronic throttle control (ETC). In this manner, throttle 364 may be operated to vary the intake air provided the combustion chambers. The position of throttle plate 366 may be provided to controller 341 by throttle position signal TP from a throttle position sensor 368. Intake passage 319 may include a mass air flow sensor 370 and a manifold air pressure sensor 372 for providing respective signals MAF and MAP to controller 341.

In FIG. 3, fuel injectors are shown coupled directly to the combustion chambers for injecting fuel directly therein in proportion to a pulse width of a signal FPW received from controller 341 via an electronic driver, for example. For example, fuel injectors 374, 376, 378, and 380 are shown in FIG. 3 coupled to cylinders 321, 323, 325, and 327, respectively. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 309 in a configuration that provides what is known as port injection of fuel into the intake ports upstream of the respective combustion chambers. Though not shown in FIG. 3, fuel may be delivered to the fuel injectors by a fuel system including a fuel tank, a fuel pump, a fuel line, and a fuel rail.

The combustion chambers of engine 301 may be operated in a compression ignition mode, with or without an ignition spark. In some examples, a distributorless ignition system (not shown) may provide ignition sparks to spark plugs coupled to the combustion chambers in response to controller 341. For example, spark plugs 382, 384, 386, and 388 are shown in FIG. 3 coupled to cylinders 321, 323, 325, and 327, respectively.

Engine 301 may include a turbocharger 390. Turbocharger 390 may include an exhaust turbine 392 and an intake compressor 394 coupled on a common shaft 396. The blades of exhaust turbine 392 may be caused to rotate about the common shaft as a portion of the exhaust gas stream discharged from engine 301 impinges upon the blades of the turbine. Intake compressor 394 may be coupled to turbine 392 such that compressor 394 may be actuated when the blades of turbine 392 are caused to rotate. When actuated, compressor 394 may then direct pressurized gas to air intake manifold 309 from where it may then be directed to engine 301. In this way, turbocharger 390 may be configured for providing a boosted aircharge to the engine intake.

Turbocharger 390 may be configured as a multi-scroll turbocharger wherein the exhaust turbine includes a plurality of scrolls. In the depicted embodiment, turbine 392 includes two scrolls, a first scroll 395 and a second scroll 397. The first scroll may be an outer scroll while the second scroll may be an inner scroll. Alternatively, the scrolls may be positioned laterally relative to each other. The scrolls may be referred to as a high flow scroll and a low flow scroll, wherein the high flow scroll is the scroll that improves turbine response at high flow conditions, and wherein the low flow scroll is the scroll that improves turbine response at low flow conditions. In one example, the low flow scroll is the outer scroll while the high flow scroll is the inner scroll. In an alternate example, the low flow scroll is the inner scroll while the high flow scroll is the outer scroll.

Each scroll may receive exhaust gas from a distinct set of cylinder via distinct exhaust manifold segments and distinct inlets. Specifically, exhaust gas from cylinders 321 and 327 may flow along a first exhaust gas entry path 302 into first outer scroll 395 while exhaust from cylinders 323 and 325 flows along a second exhaust gas entry path 304 into second inner scroll 397. In addition, a conduit 369 with communication valve 371 may couple exhaust manifold segment 365 with exhaust manifold segment 367 upstream of the turbine. In doing so, exhaust from all cylinders may be directed to each of the scrolls, allowing for a higher turbine output. In some embodiments, a scroll valve 306 may be coupled in first exhaust gas entry path 302 between engine exhaust manifold 329 and an inlet of the first outer scroll 395. In this way, exhaust turbine 392 is configured as a binary flow turbine. As elaborated below, by adjusting a position of the scroll valve 306, an amount of exhaust gas directed to the turbine can be varied. As such, the scroll valve is not coupled to an inlet of the second inner scroll.

A wastegate 310 may be coupled across turbine 392. Specifically, wastegate 310 may be included in a bypass 308 coupled between an inlet and outlet of the exhaust turbine. By adjusting a position of wastegate 310, an amount of boost provided by the turbine may be controlled. While the depicted example shows bypass 308 coupling exhaust manifold segment 367 to the outlet of the turbine, in an alternate example, bypass 308 may additionally or alternatively couple exhaust manifold segment 365 to the outlet of the turbine.

Exhaust gases may also be recirculated from the one or both of the exhaust manifold segments 365, 367 (herein depicted being recirculated from only exhaust manifold segment 365) to intake passage 319 via an exhaust gas recirculation (EGR) passage 328. EGR passage 328 may include an EGR valve 330 for controlling an amount of EGR as well as an EGR cooler for controlling a temperature of the EGR delivered to the engine intake.

Exhaust gases exiting turbine 392 and/or wastegate 310 may pass through an emission control device 312. Emission control device 312 can include multiple catalyst bricks, in one example. After passing through emission control device 312, exhaust gas may be directed to a tailpipe 314.

In some examples, controller 341 may be a conventional microcomputer including: a microprocessor unit, input/output ports, read-only memory, random access memory, keep alive memory, and a conventional data bus. Controller 341 is shown in FIG. 3 receiving various signals from sensors coupled to engine 301, in addition to those signals previously discussed, such as the sensors previously described in reference to FIG. 2. Based on the input from the various sensors, controller 341 may be configured to perform various control routines and actuate one or more engine actuators. The actuators may include, for example, intake throttle 364, EGR valves 320 and 330, wastegate 310, and scroll valve 306, in addition to the actuators previously described in reference to FIG. 2.

As such, by adjusting scroll valve 306 based on engine operating conditions, the turbine may be operated in different modes, and the dynamic range over which boost can be provided by the turbocharger is enhanced. For example, the turbocharger may be operated in a first mode with the scroll valve closed (e.g., fully closed) during selected conditions, such as at low engine speeds, during engine cold-starts, and in response to an increased demand for torque. When operating in the first mode with the scroll valve closed, the turbine behaves like a small mono-scroll turbine, providing faster spin-up and BMEP. Herein, the closing of the scroll valve shuts off exhaust flow to the first scroll. The resulting limited flow of exhaust through only one of the scrolls increases exhaust manifold pressure and turbine inlet pressure (and engine backpressure). By raising the pressure of exhaust flowing through the turbine, turbine speed and power in increased, particularly when the engine is operating at low speeds and during transient performance. When coordinated with adjustments to the wastegate, as well as one or both EGR systems (to provide cooled EGR benefits), the time to desired torque and turbine spin-up can be substantially improved. Selectively operating the engine with a cylinder deactivation pattern in addition to closing the scroll valve may provide further benefits to turbine performance.

As another example, the turbocharger may be operated in a second mode with the scroll valve open (e.g., fully open) during selected conditions. When operating in the second mode with the scroll valve open, the turbine behaves like a large mono-scroll turbine, providing improved peak power. Herein, the opening of the scroll causes exhaust to flow through both the first and second scroll. The resulting drop in exhaust manifold pressure allows more fresh air to be drawn into the engine intake. The increased flow of exhaust through the turbine also increases the driving of the turbine. When coordinated with adjustments to the wastegate, as well as one or both EGR systems, boosted engine performance is improved, a stoichiometric window is enlarged and the fuel economy benefits of cooled EGR are achieved. Selectively operating the engine with a cylinder deactivation pattern in addition to closing the scroll valve may provide further benefits to turbine performance.

While the above modes describe the scroll valve as being either fully open or fully closed, it will be appreciated that in still other modes, the scroll valve may be adjusted to any (variable) position between the fully open and fully closed states, based on engine operating conditions. For example, based on engine operating conditions, the scroll valve may be opened or closed incrementally (e.g., in 20% increments).

Figure 7:
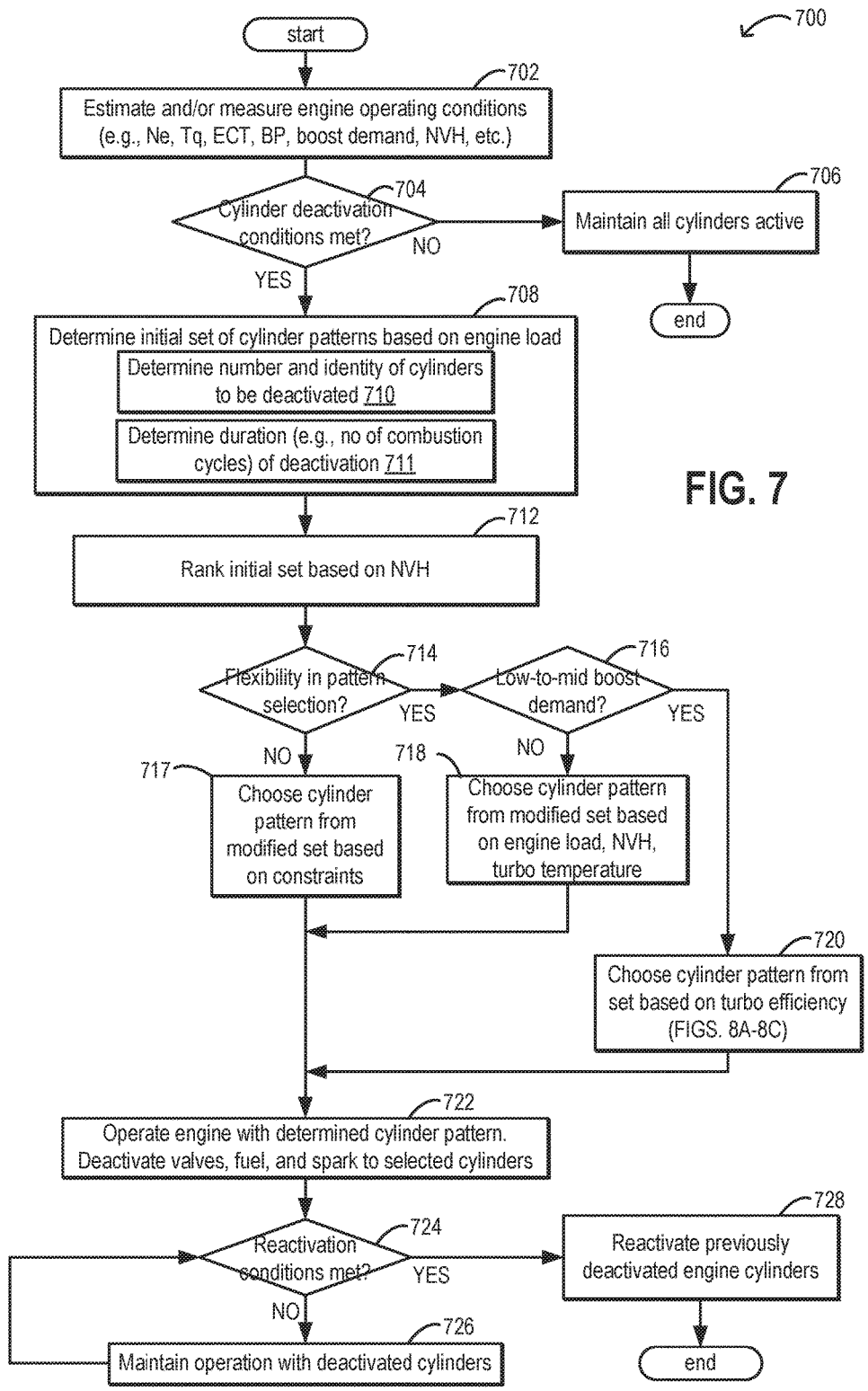
FIG. 7 shows a high level flow chart for adjusting a cylinder pattern of a skip-fire engine responsive to boost demand.
Figure 8A:
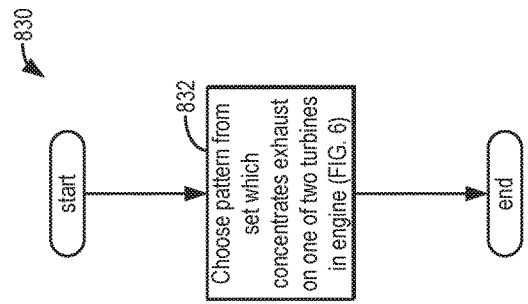
FIG. 8A shows a flow chart for selecting a cylinder pattern of a skip-fire engine responsive to boost demand in a boosted engine including a binary-flow turbine.
Figure 8B:
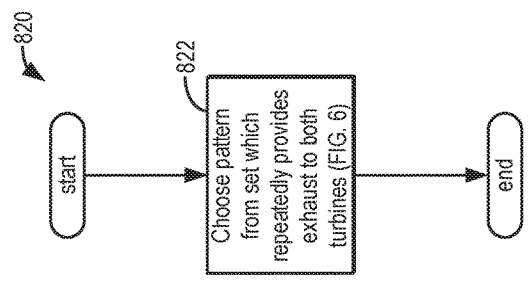
FIG. 8B shows a flow chart for selecting a cylinder pattern of a skip-fire engine responsive to boost demand in a boosted engine including two turbines with a common compressor outlet.
Figure 8C:
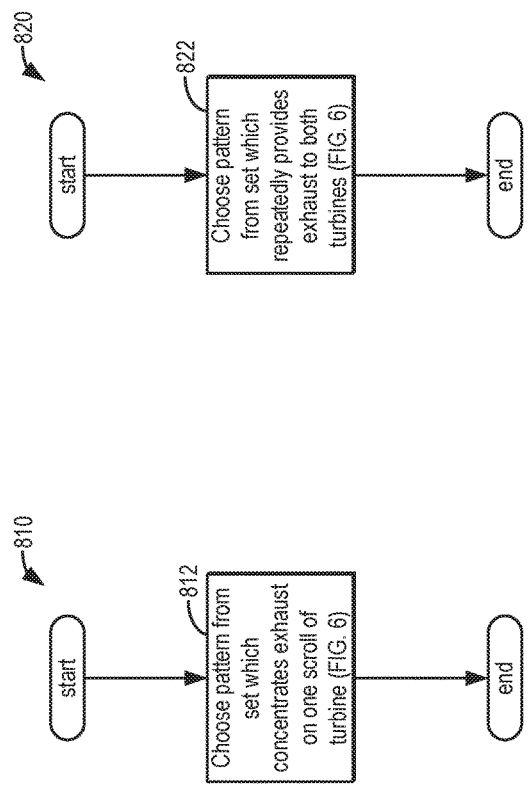
FIG. 8C shows a flow chart for selecting a cylinder pattern of a skip-fire engine responsive to boost demand for a boosted engine including two turbines with distinct compressor outlets.

During conditions when engine system 300 is operating with cylinder deactivation, as further described in reference to FIG. 7, a cylinder pattern may be selected which improves turbine response. For example, a cylinder pattern may be selected, if possible, wherein a distribution and frequency of exhaust pulses from firing cylinders is concentrated towards only one of scrolls 395, 397, as further detailed in reference to FIG. 8A. Referring to the example engine system in FIG. 3, exhaust flow may be directed toward only one of scrolls 395, 397 by adjusting scroll valve 306 while selecting a cylinder pattern that concentrates firing cycles on cylinders connected to one of the scrolls.

Figure 4:
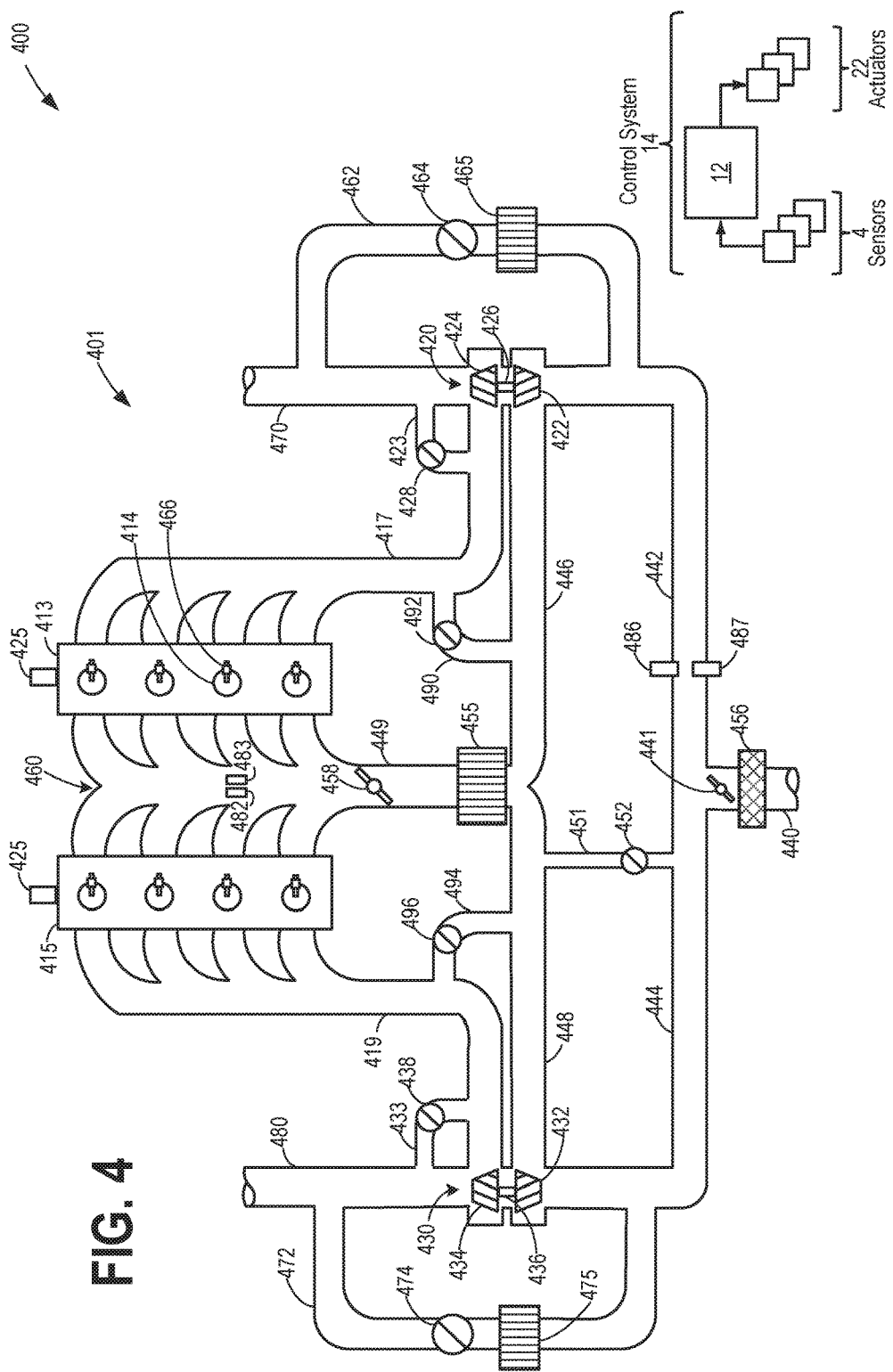
FIG. 4 shows a schematic depiction of a boosted engine system including two turbines with a common compressor outlet.

FIG. 4 shows a schematic depiction of an example turbocharged engine system 400 including a multi-cylinder internal combustion engine 401 and twin turbochargers 420 and 430 with connected compressor outlets 446 and 448. As one non-limiting example, engine system 400 can be included as part of a propulsion system for a passenger vehicle. Engine system 400 can receive intake air via intake passage 440. Intake passage 440 can include an air filter 456 and an EGR throttle valve 441. Engine system 400 may be a split-engine system wherein intake passage 440 is branched downstream of EGR throttle valve 441 into first and second parallel intake passages, each including a turbocharger compressor. Specifically, at least a portion of intake air is directed to compressor 422 of turbocharger 420 via a first parallel intake passage 442 and at least another portion of the intake air is directed to compressor 432 of turbocharger 430 via a second parallel intake passage 444 of the intake passage 440.

The first portion of the total intake air that is compressed by compressor 422 may be supplied to intake manifold 460 via first parallel compressor outlet 446. In this way, intake passage 442 and compressor outlet 446 form a first parallel branch of the engine's air intake system. Similarly, a second portion of the total intake air can be compressed via compressor 432 where it may be supplied to intake manifold 460 via second parallel compressor outlet 448. Thus, intake passage 444 and compressor outlet 448 form a second parallel branch of the engine's air intake system. As shown in FIG. 4, intake air from compressor outlets 446 and 448 can be recombined via a common intake passage 449 before reaching intake manifold 460, where the intake air may be provided to the engine.

In some examples, intake manifold 460 may include an intake manifold pressure sensor 482 for estimating a manifold pressure (MAP) and/or an intake manifold temperature sensor 483 for estimating a manifold air temperature (MCT), each communicating with controller 12. Intake passage 449 can include an air cooler 455 and/or a throttle (such as second throttle valve 458). The position of throttle valve 458 can be adjusted by the control system via a throttle actuator (not shown) communicatively coupled to controller 12. An anti-surge valve 452 may be provided to selectively bypass the compressor stages of turbochargers 420 and 430 via bypass passage 451. As one example, anti-surge valve 452 can open to enable flow through bypass passage 451 when the intake air pressure upstream of the compressors attains a threshold value.

Engine 401 may include a plurality of cylinders 414. In the depicted example, engine 401 includes eight cylinders arrange in a V-configuration. Specifically, the eight cylinders are arranged on two banks 413 and 415, with each bank including four cylinders. In alternate examples, engine 401 can include two or more cylinders such as 4, 5, 6, 10 or more cylinders. These various cylinders can be equally divided and arranged in alternate configurations, such as V, in-line, boxed, etc. Each cylinder 414 may be configured with a fuel injector 466. In the depicted example, fuel injector 466 is a direct in-cylinder injector. However, in other examples, fuel injector 466 can be configured as a port based fuel injector.

Intake air supplied to each cylinder 414 (herein, also referred to as combustion chamber 414) via common intake passage 449 may be used for fuel combustion and products of combustion may then be exhausted from via bank-specific parallel exhaust passages. In the depicted example, a first bank 413 of cylinders of engine 401 can exhaust products of combustion via a first parallel exhaust passage 417 and a second bank 415 of cylinders can exhaust products of combustion via a second parallel exhaust passage 419. Each of the first and second parallel exhaust passages 417 and 419 may further include a turbocharger turbine. Specifically, products of combustion that are exhausted via exhaust passage 417 can be directed through exhaust turbine 424 of turbocharger 420, which in turn can provide mechanical work to compressor 422 via shaft 426 in order to provide compression to the intake air. Alternatively, some or all of the exhaust gases flowing through exhaust passage 417 can bypass turbine 424 via turbine bypass passage 423 as controlled by wastegate 428. Similarly, products of combustion that are exhausted via exhaust passage 419 can be directed through exhaust turbine 434 of turbocharger 430, which in turn can provide mechanical work to compressor 432 via shaft 436 in order to provide compression to intake air flowing through the second branch of the engine's intake system. Alternatively, some or all of the exhaust gas flowing through exhaust passage 419 can bypass turbine 434 via turbine bypass passage 433 as controlled by wastegate 438. In some examples, a plurality of exhaust passages may be associated with specific sets of cylinders 414. Each exhaust passage may direct exhaust a set of cylinders to one or more specific components of engine system 400.

In some examples, exhaust turbines 424 and 434 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 424 and 434 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 424 and 434 via respective actuators. In alternate examples, exhaust turbines 424 and 434 may be configured as twin-scroll or binary flow turbines, wherein controller 12 may adjust the portion of exhaust gas that is directed through each of two turbine scrolls via a scroll valve.

Exhaust gases in first parallel exhaust passage 417 may be directed to the atmosphere via branched parallel exhaust passage 470 while exhaust gases in second parallel exhaust passage 419 may be directed to the atmosphere via branched parallel exhaust passage 480. Exhaust passages 470 and 480 may include one or more exhaust after-treatment devices, such as a catalyst, and one or more exhaust gas sensors.

Engine 401 may further include one or more exhaust gas recirculation (EGR) passages, or loops, for recirculating at least a portion of exhaust gas from first and second parallel exhaust passages 417 and 419 and/or first and second parallel branched exhaust passages 470 and 480, to first and second parallel intake passages 442 and 444, and/or parallel compressor outlets 446 and 448. These may include high-pressure EGR loops 490, 494 with flow control valves 492, 496 for proving high-pressure EGR (HP-EGR) and low-pressure EGR-loops 462, 472 with flow control valves 464, 474 for providing low-pressure EGR (LP-EGR). LP-EGR loops 462, 472 may further include charge air coolers 465, 475 for adjusting the temperature of exhaust gas before recirculation into the engine intake. In one example, HP-EGR may be provided in the absence of boost provided by turbochargers 420, 430, while LP-EGR may be provided in the presence of turbocharger boost and/or when exhaust gas temperature is above a threshold. In still other examples, both HP-EGR and LP-EGR may be provided simultaneously.

The position of intake and exhaust valves of each cylinder 414 may be regulated via hydraulically actuated lifters coupled to valve pushrods, or via a cam profile switching mechanism in which cam lobes are used. In this example, at least the intake valves of each cylinder 414 may be controlled by cam actuation using a cam actuation system. Specifically, the intake valve cam actuation system 425 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 400 may be controlled at least partially by a control system 14 including controller 12 and by input from a vehicle operator via an input device (not shown). Control system 14 is shown receiving information from a plurality of sensors 4 (various examples of which are described herein) and sending control signals to a plurality of actuators 22. As one example, sensors 4 and actuators 22 may include the sensors previously described in reference to FIG. 2. Other actuators, such as a variety of additional valves and throttles, may be coupled to various locations in engine system 400. Controller 12 may receive input data from the various sensors, process the input data, and trigger the actuators in response to the processed input data based on instruction or code programmed therein corresponding to one or more routines.

During conditions when engine system 400 is operating with cylinder deactivation, as further described in reference to FIG. 7, a cylinder pattern may be selected which improves turbine response. For a twin-turbo system with a common compressor outlet, a cylinder pattern may be selected that directs exhaust from the active cylinders towards each of turbines 424, 434 with a distribution and frequency, as further detailed in reference to FIG. 8B, that improves turbine response. Referring to the example engine system in FIG. 4, a cylinder pattern may be selected that concentrates the firing on one or more cylinders on each of banks 413, 415 at a desired frequency, because each bank leads to a separate turbine. Herein, patterns that repeatedly skip cylinders that feed either turbine may be avoided. In addition, cylinder pattern with long delays between firing events may be avoided to reduce the likelihood of compressor surge.

For example, when the twin-turbo system has a common intake, if either turbine slows down too much, the turbocharger may stall, which would allow boosted air from the other turbocharger to flow backwards and create NVH issues. Herein, a cylinder pattern that feeds both turbocharger turbines equally may be selected.

In comparison, when the twin-turbo system has separate intakes, as discussed below, a cylinder pattern may be selected where firing is concentrated to one turbine. This may allow the selected turbocharger to build boost at least for its bank of cylinders. In another example, the twin-turbo system may include a valve that separates the intake manifolds only when desired.

Figure 5:
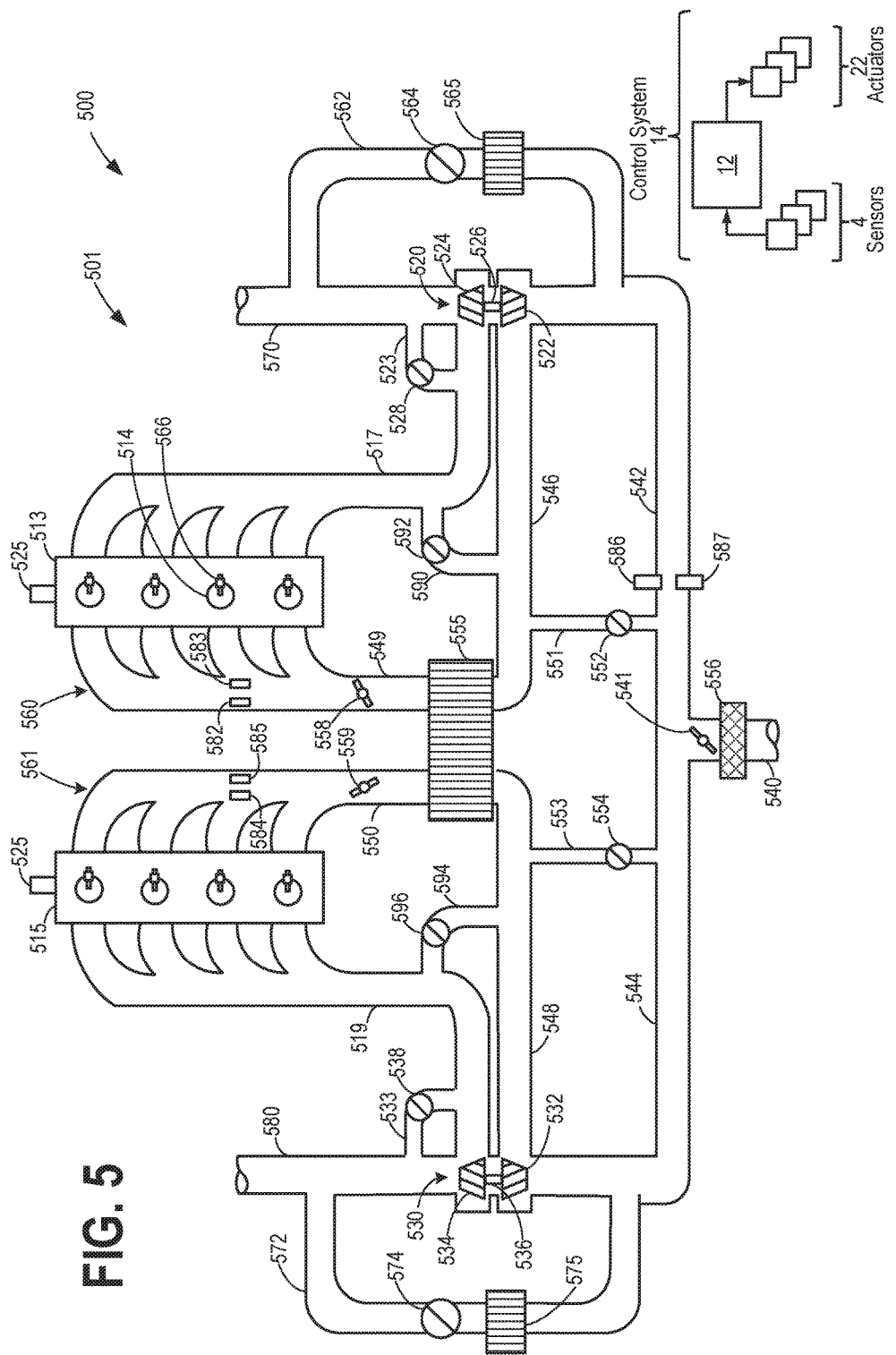
FIG. 5 shows a schematic depiction of a boosted engine system including two turbines with distinct compressor outlets.
Figure 6:
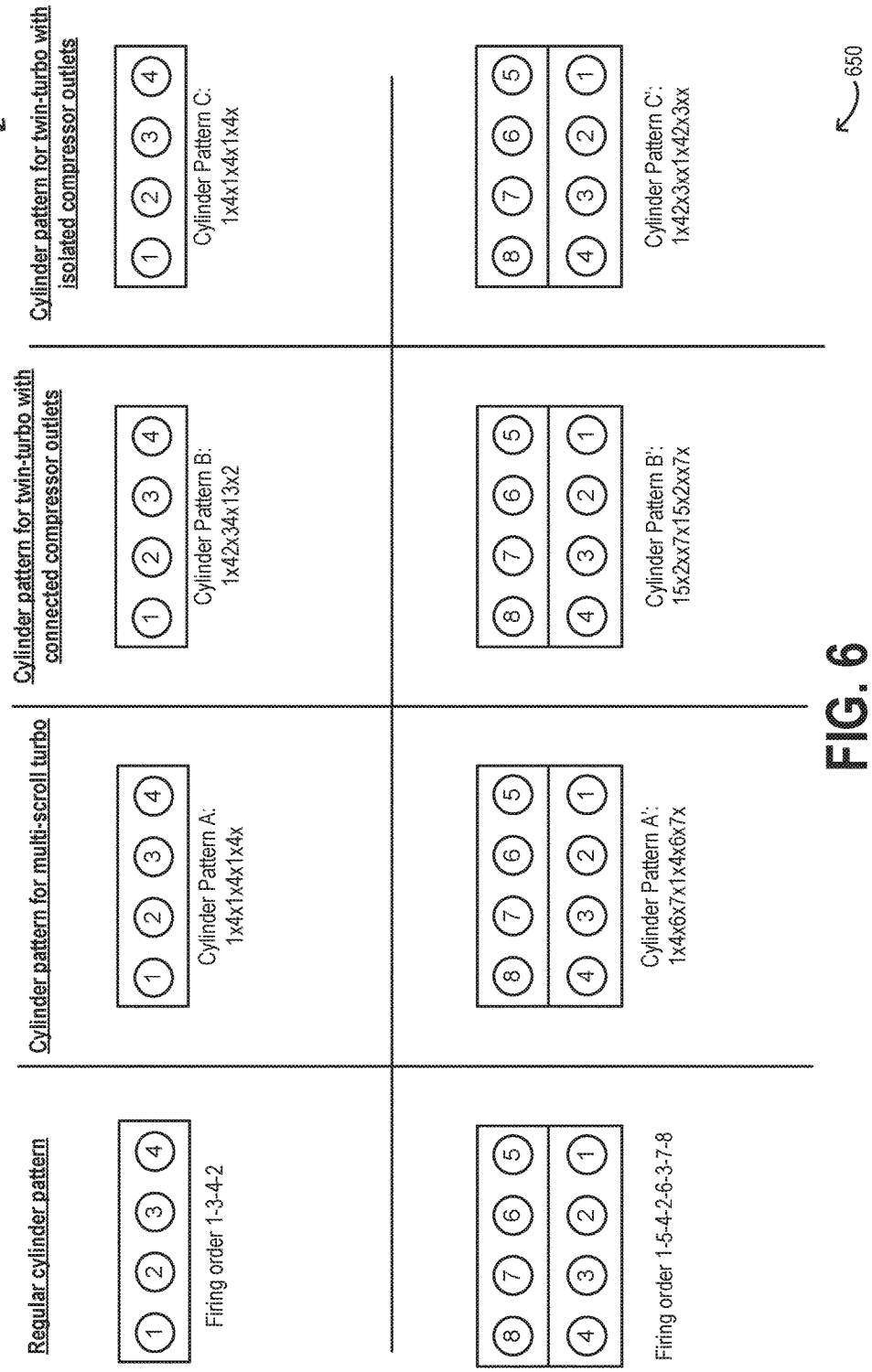
FIG. 6 shows example cylinder patterns in an in-line 4-cylinder engine and a V-8 engine.

FIG. 5 shows a schematic depiction of an example turbocharged engine system 500 including a multi-cylinder internal combustion engine 501 and twin turbochargers 520 and 530. As one non-limiting example, engine system 500 can be included as part of a propulsion system for a passenger vehicle. Engine system 500 can receive intake air via intake passage 540. Intake passage 540 can include an air filter 556 and an EGR throttle valve 541. Engine system 500 may be a split-engine system wherein intake passage 540 is branched downstream of EGR throttle valve 541 into first and second parallel intake passages, each including a turbocharger compressor. Specifically, at least a portion of intake air is directed to compressor 522 of turbocharger 520 via a first parallel intake passage 542 and at least another portion of the intake air is directed to compressor 532 of turbocharger 530 via a second parallel intake passage 544 of the intake passage 540.

The first portion of the total intake air that is compressed by compressor 522 may be supplied to intake manifold 560 via a first compressor outlet 546. In this way, intake passage 542 and compressor outlet 546 form a first branch of the engine's air intake system. Similarly, a second portion of the total intake air that is compressed via compressor 532 may be supplied to intake manifold 561 via a second compressor outlet 548. Thus, intake passage 544 and compressor outlet 548 form a second branch of the engine's air intake system, distinct from the first branch. Compressor outlets 546 and 548 are connected to separate intake manifolds 560 and 561, where the intake air may be provided to separate parts the engine. Intake manifolds 560 and 561 may provide intake air to separate subsets of cylinders 514. As shown in FIG. 5, intake manifold 560 may provide intake air to the cylinders of bank 513, and intake manifold 561 may provide intake air to the cylinders of bank 515. It may be appreciated that in alternate embodiments of engine 501, the sets of cylinders to which intake manifolds 560 and 561 may provide intake air to sets of cylinders which differ from those depicted in FIG. 5.

In some examples, intake manifolds 560, 561 may include intake manifold pressure sensors 582, 584 for estimating a manifold pressure (MAP) in each manifold and/or intake manifold temperature sensors 583, 585 for estimating a manifold air temperature (MCT) in each manifold, each communicating with controller 12. Each of intake passages 549, 550 can include an air cooler 555 and/or a throttle (such as second and third throttle valves 558, 559). The position of throttle valves 558, 559 can be adjusted by the control system via a throttle actuator (not shown) communicatively coupled to controller 12. Anti-surge valves 552, 554 may be provided to selectively bypass the compressor stages of turbochargers 520 and 530 via respective bypass passages 551, 553. As one example, anti-surge valves 552, 554 can open to enable flow through bypass passages 551, 553 when one of the intake air pressures upstream of the respective compressors 522, 532 attains a threshold value.

Engine 501 may include a plurality of cylinders 514. In the depicted example, engine 501 includes eight cylinders arrange in a V-configuration. Specifically, the eight cylinders are arranged on two banks 513 and 515, with each bank including four cylinders. In alternate examples, engine 501 can include two or more cylinders such as 4, 5, 6, 10 or more cylinders. These various cylinders can be equally divided and arranged in alternate configurations, such as V, in-line, boxed, etc. Each cylinder 514 may be configured with a fuel injector 566. In the depicted example, fuel injector 566 is a direct in-cylinder injector. However, in other examples, fuel injector 566 can be configured as a port based fuel injector.

Intake air supplied to each cylinder 514 (herein, also referred to as combustion chamber 514) via one of intake passages 549, 550 may be used for fuel combustion and products of combustion may then be exhausted from via bank-specific parallel exhaust passages. In the depicted example, a first bank 513 of cylinders of engine 501 can exhaust products of combustion via a first parallel exhaust passage 517 and a second bank 515 of cylinders can exhaust products of combustion via a second parallel exhaust passage 519. Each of the first and second parallel exhaust passages 517 and 519 may further include a turbocharger turbine. Specifically, products of combustion that are exhausted via exhaust passage 517 can be directed through exhaust turbine 524 of turbocharger 520, which in turn can provide mechanical work to compressor 522 via shaft 526 in order to provide compression to the intake air. Alternatively, some or all of the exhaust gases flowing through exhaust passage 517 can bypass turbine 524 via turbine bypass passage 523 as controlled by wastegate 528. Similarly, products of combustion that are exhausted via exhaust passage 519 can be directed through exhaust turbine 534 of turbocharger 530, which in turn can provide mechanical work to compressor 532 via shaft 536 in order to provide compression to intake air flowing through the second branch of the engine's intake system. Alternatively, some or all of the exhaust gas flowing through exhaust passage 519 can bypass turbine 534 via turbine bypass passage 533 as controlled by wastegate 538. In some examples, a plurality of exhaust passages may be associated with specific sets of cylinders 514. Each exhaust passage may direct exhaust a set of cylinders to one or more specific components of engine system 500.

In some examples, exhaust turbines 524 and 534 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 524 and 534 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 524 and 534 via respective actuators. In alternate examples, exhaust turbines 524 and 534 may be configured as twin-scroll or binary flow turbines, wherein controller 12 may adjust the portion of exhaust gas that is directed through each of two turbine scrolls via a scroll valve.

Exhaust gases in first parallel exhaust passage 517 may be directed to the atmosphere via branched parallel exhaust passage 570 while exhaust gases in second parallel exhaust passage 519 may be directed to the atmosphere via branched parallel exhaust passage 580. Exhaust passages 570 and 580 may include one or more exhaust after-treatment devices, such as a catalyst, and one or more exhaust gas sensors.

Engine 501 may further include one or more exhaust gas recirculation (EGR) passages, or loops, for recirculating at least a portion of exhaust gas from first and second parallel exhaust passages 517 and 519 and/or first and second parallel branched exhaust passages 570 and 580, to first and second parallel intake passages 542 and 544, and/or parallel compressor outlets 446 and 548. These may include high-pressure EGR loops 590, 594 with flow control valves 592, 596 for proving high-pressure EGR (HP-EGR) and low-pressure EGR-loops 562, 572 with flow control valves 564, 574 for providing low-pressure EGR (LP-EGR). LP-EGR loops 562, 572 may further include charge air coolers 565, 575 for adjusting the temperature of exhaust gas before recirculation into the engine intake. In one example, HP-EGR may be provided in the absence of boost provided by turbochargers 520, 530, while LP-EGR may be provided in the presence of turbocharger boost and/or when exhaust gas temperature is above a threshold. In still other examples, both HP-EGR and LP-EGR may be provided simultaneously.

The position of intake and exhaust valves of each cylinder 514 may be regulated via hydraulically actuated lifters coupled to valve pushrods, or via a cam profile switching mechanism in which cam lobes are used. In this example, at least the intake valves of each cylinder 514 may be controlled by cam actuation using a cam actuation system. Specifically, the intake valve cam actuation system 525 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation.

Engine system 500 may be controlled at least partially by a control system 14 including controller 12 and by input from a vehicle operator via an input device (not shown). Control system 14 is shown receiving information from a plurality of sensors 4 (various examples of which are described herein) and sending control signals to a plurality of actuators 22. As one example, sensors 4 and actuators 22 may include the sensors previously described in reference to FIG. 2. Other actuators, such as a variety of additional valves and throttles, may be coupled to various locations in engine system 500. Controller 12 may receive input data from the various sensors, process the input data, and trigger the actuators in response to the processed input data based on instruction or code programmed therein corresponding to one or more routines.

During conditions when engine system 500 is operating with cylinder deactivation, as further described in reference to FIG. 7, a cylinder pattern may be selected which improves turbine response under low-to-mid boost demands. For a twin-turbo system with distinct compressor outlets, a cylinder pattern may be selected which has a firing distribution and frequency that concentrates exhaust flow from the active cylinders towards only one of turbines 524, 534, as further detailed in reference to FIG. 8C. Referring to the example engine system in FIG. 5, such a pattern may include deactivation of cylinders on only one of banks 513, 515 while maintaining cylinders on the other bank active. Because each bank leads to a separate turbine, adjusting the cylinder pattern in this way may concentrate exhaust flow on only one of turbines 524, 534 and improve turbocharger performance.

FIG. 6 shows example cylinder patterns that may be used for an in-line 4 cylinder engine during selected conditions at map 600, and cylinder patterns that may be used for a V-8 engine at map 650. Map 600 compares a regular cylinder firing pattern for the in-line 4 cylinder engine to example cylinder patterns that may be applied to boosted engines of varying turbine configurations: multi-scroll turbine (cylinder pattern A), twin-turbo with connected compressor outlets (cylinder pattern B), or twin-turbo with distinct compressor outlets (cylinder pattern C). Likewise, map 650 compares a regular cylinder firing pattern for the V-8 engine to example cylinder patterns that may be applied to a boosted engine system containing a multi-scroll turbine (cylinder pattern A'), containing a twin-turbo with connected compressor outlets (cylinder pattern B'), and containing a twin-turbo with distinct compressor outlets (cylinder pattern C'). The details of these example turbine configurations are further described in FIGS. 3-5.

In particular, the in-line 4 cylinder engine with cylinders labeled 1 through 4 as shown has a firing pattern of 1-3-4-2. Thus, during regular operating conditions, when no cylinder is deactivated and all cylinders are active, the cylinders may be firing as 134213421342 and so on. The V-8 engine with cylinders labeled 1 through 8 as shown has a firing pattern of 1-5-4-2-6-3-7-8. Thus, during regular operating conditions, when no cylinder is deactivated and all cylinders are active, the cylinders may be firing as 1542637815426378 and so on.

In response to cylinder deactivation conditions being met, to provide fuel economy benefits, the controller may shift engine operation to cylinder patterns A and A' in the I4 and V8 engines respectively, wherein cylinder pattern A includes 1x4x1x4x1x4x1x4x (assuming cylinders 1 and 4 are plumbed to one scroll and cylinders 2 and 3 are plumbed to the other) and cylinder pattern A' includes 1x4x6x7x1x4x6x7x (assuming cylinders 1, 4, 6, and 7 are plumbed to one scroll and cylinders 2, 3, 5, and 8 are plumbed to the other scroll), and wherein x represents a skipped cylinder. Such a pattern may be selected during conditions when boost is desired in an engine with a multi-scroll turbine. In this pattern, exhaust distribution is concentrated toward one scroll of the turbine, and thereby may improve turbine efficiency. Cylinder patterns A and A' may alternatively be applied during conditions when boost is demanded in a twin-turbo engine with multi-scroll turbines and distinct compressor outlets. Still other cylinder firing patterns may be appropriate. In such a condition, exhaust gas distribution may be concentrated on only one scroll of one turbine of the twin-turbo system. Thus the respective efficiencies of the turbine and the turbo system may be improved simultaneously.

In comparison, during conditions when boost is demanded in a twin-turbo engine with connected compressor outlets, the controller may operate the engine with cylinder patterns B and B' in the I4 and V8 engines respectively. Cylinder pattern B includes 1x42x34x13x2 and B' includes 15x2xx7x15x2xx7x (assuming one turbocharger on each bank). This pattern may ensure that both turbines are supplied with exhaust gas without delays longer than a specified time threshold. As a result, both turbines may maintain their turbine speed, and risk of compressor surge may be reduced. However, such a pattern that concentrates on selected cylinders frequently may have lower fuel economy benefits.

In cylinder patterns C and C' in the I4 and V8 engines respectively, the firing pattern for a twin-turbo engine is adjusted to 1x4x1x4x and 1x42x3xx1x42x3xx. This approach concentrates exhaust gas distribution on one of the two turbines, which may improve turbine efficiency. In particular, the specific exhaust gas distribution allows the reduced exhaust flow to be concentrated on one turbine, thereby spinning up the turbine to a higher turbine speed. This allows for the turbocharger to be operated with fewer cylinders up to higher loads since one manifold can be operated boosted.

FIG. 7 provides an example routine 700 for operating a boosted engine with cylinder deactivation patterns which enhance turbocharger performance. The routine includes selecting an initial set of cylinder patterns based on engine load, modifying the initial set based on parameters such as NVH, and, whenever flexibility remains, further modifying the set of patterns based on turbocharger efficiency.

The routine begins by determining engine operating conditions at 702, which may include engine speed, engine load, driver torque demand, ambient conditions, engine coolant temperature, current boost level, boost demand, MAP, MAF, exhaust temperature, NVH levels, etc. These conditions may be evaluated at 704 to determine whether cylinder deactivation conditions have been met. In one example, cylinder deactivation conditions are considered met when engine load is lower than a threshold. In another example, cylinder deactivation conditions are considered met when driver demand (including driver boost demand) is lower than a threshold. As such, when engine load is higher than a threshold or driver demand (including boost demand) is higher than a threshold, cylinder deactivation conditions may not be considered met and all engine cylinders may be maintained active at 706. In one example, selective cylinder deactivation may be enabled while boost demand is in a low-to-mid load range, whereas selective cylinder deactivation may be disabled while boost demand is in a mid-high load range.

If cylinder deactivation conditions have been met, a cylinder pattern may be selected for selective deactivation. In one example, an initial set of one or more cylinder patterns may be selected for the engine load at 708, and then a pattern may be further selected from this initial set. The initial set of cylinder patterns may be retrieved from a look-up table stored in the engine controller's memory wherein cylinder patterns are saved as a function of engine load. As such, the initial set of patterns selected for a given engine load may be different in different engine systems based on the engine configuration including the number of cylinders and arrangement of cylinders on banks.

Determining the initial set of cylinder patterns may include, at 710, for each pattern, determining a total number of cylinders to be deactivated over a given engine cycle, a total number of remaining active engine cylinders, and an identity of the deactivated and active cylinders. Cylinder pattern selection may take into account the position of engine cylinders (e.g., bank-specific location) and firing order of the active cylinders. The number of deactivated cylinders in each cylinder pattern may be based on engine load, with the number of deactivated cylinders decreasing with increased engine load. The engine controller may also determine durations over which to operate the engine with each cylinder pattern at 711. For instance, the controller may determine a number of combustion cycles over which cylinders in the cylinder pattern are to be maintained deactivated.

In some examples, operating the engine with a cylinder pattern based on engine load may improve fuel efficiency while degrading other engine conditions, such as engine NVH and turbocharger performance. To reduce degradation of NVH conditions and turbocharger performance, the initial set of patterns (selected based on engine load) may be further modified based on these conditions at 712 whenever possible. In one example, modifying the initial set may include ranking each pattern in the initial set according to estimated effects on NVH conditions, turbine temperature, and turbocharger performance. The rankings of each pattern according to estimated effects on NVH, turbine temperature, and turbocharger performance may be stored in the look-up table such that when cylinder patterns are retrieved, the patterns are listed based on their ranking. The estimated effect on a cylinder pattern on turbocharger performance may be calculated based on one or more of the effect of the cylinder pattern on turbine speed and turbine temperature. It will be appreciated that the ranking of patterns and weighting of conditions may be based on their effect on various engine conditions; however selecting the initial set of cylinder patterns may be based on engine load only.

After modifying/ranking the initial set, a pattern from the modified set may be selected based on engine conditions opportunistically, as elaborated below. In some examples, based on the particular engine condition selected for ranking, the initial set may be restricted to only one cylinder pattern. For example, there may be only a single cylinder pattern that meets the engine load requirement while also reducing overheating of a turbine when the additional selection criteria includes improving turbocharger performance based on turbine temperature. In one example, this single pattern may be identified via the lookup table based on its highest ranking among the modified set according to turbine temperature. In another example, a cylinder pattern which meets the engine load requirement and reduces engine NVH may be selected when NVH is above an upper threshold. A cylinder pattern may also be chosen to reduce exhaust emissions, such as particulates. A cylinder pattern may alternatively be chosen to reduce the number of deactivations and reactivations on a given cylinder to reduce heat or wear in the valve-train actuators.

Continuing at 714, it is determined whether there is flexibility in choosing a cylinder pattern. In one example, there may be no flexibility if the initial set only includes a single cylinder pattern. In another example, there may be no flexibility if the initial set includes one or more cylinder patterns that degrade NVH and/or degrade turbocharger performance. If there is no flexibility, the controller may select the only cylinder pattern that meets the engine load constraints at 717. If there is flexibility in pattern selection, one or more additional engine operating criteria may be taken into consideration for selecting a cylinder pattern, and routine 700 proceeds to 716. In the depicted example, at 716, it may be determined if the boost demand is in the low-tomid range. If yes, then at 720, a cylinder pattern that enhances turbocharger performance in the low-to-mid boost demand region may be selected. The boost demand may be inferred based on pedal position, such as during a tip-in to less than wide open throttle. Alternatively, the boost demand may be predicted based on the current boost demand as well as the vehicle trajectory. For example, during conditions when the vehicle has completed travel on a downhill and/or has just started travel on an uphill (e.g., via navigational input), an increase in boost demand may be predicted, and the controller may select a cylinder pattern that improves turbocharger response to reduce the likelihood of turbo lag when boost demand increases. The cylinder pattern selected based on turbocharger performance may be based on the exhaust gas pulse distribution associated with the firing cylinders, the turbine configuration of the engine, and specific boost demand. This process is further described in reference to routines 810, 820, and 830 of FIGS. 8A-C.

In one example, the pattern may be selected based on a weighting of conditions such as NVH and turbine temperature in addition to turbocharger performance. For instance, a look-up table may contain a ranking of each cylinder pattern based on each engine condition, a weighting of these rankings may be constructed based on relative priority, and the pattern with the highest weighted ranking may be selected. In this way, turbocharger performance may have a larger relative weight when a medium boost demand is present than when a low boost is present. It will be appreciated that NVH (or another engine condition) may be weighted more heavily than turbocharger performance despite the presence of a boost demand.

If boost demand is not present, a cylinder pattern may be opportunistically selected which improves conditions such as engine NVH at 718. In one example, the pattern may be selected based on a weighting of priority of each condition. For instance, a look-up table may contain a ranking of each cylinder pattern based on each condition, and a weighting of these rankings may be constructed based on relative priority. In this way, a cylinder pattern may be selected to optimize engine operation for engine load, and NVH conditions, when boost is not desired, and consideration may also be given to enhancing turbocharger efficiency in response to a demand for boost.

After a cylinder pattern has been selected at one of 717, 718, or 720, the engine may operate with the selected cylinder pattern at 722. Operating with the selected cylinder pattern may include deactivating a number of individual cylinder valve mechanisms to provide a total number of deactivated/active cylinders of the selected cylinder pattern. In addition, fueling and spark to the deactivated cylinders may be disabled. The engine may then operate with the determined cylinder pattern for a duration previously determined at 711.

After operating with the cylinder pattern for the determined duration, routine 700 proceeds to 724, where it is determined if cylinder reactivation conditions have been met. If cylinder reactivation conditions are met, the previously deactivated cylinders may be reactivated at 728, and routine 700 exits. Reactivation conditions may include, for example, engine load being above a threshold, or boost demand rising above an upper threshold. Reactivating individual cylinders may include reactivating individual cylinder valve mechanisms (such as activating one or more of an intake valve and an exhaust valve), reactivating cylinder fuel and spark ignition. If reactivation conditions are not met, the engine may continue to operate with one of more deactivated cylinders according to the selected cylinder pattern at 726 until they are met.

FIGS. 8A-8C depict example routines 800, 810, and 820 for opportunistically selecting a cylinder pattern that enhances turbocharger efficiency from a set of cylinder patterns that meet engine load requirements. Routine 810 (FIG. 8A) may be executed when the boosted engine system includes a multi-scroll turbine (such as a twin-scroll turbine), routine 820 (FIG. 8B) may be executed when the boosted engine system includes a twin-turbo with connected compressor outlets, and routine 830 (FIG. 8C) may be executed when the boosted engine system includes a twin-turbo with distinct compressor outlets. It will be appreciated that these routines are non-limiting examples of routines that may be executed to choose a cylinder pattern that optimizes turbo performance. Routines 810, 820, and 830 may be executed as part of a general cylinder pattern selection method, for example as part of routine 700 at 720, after engine conditions have been checked and a modified set of cylinder patterns which are appropriate for engine load, NVH conditions, and turbine temperature has been determined.

Routine 810 comprises, at 812, selecting a pattern from a modified set of cylinder patterns wherein exhaust pulses from firing cylinders are directed from active cylinders into only one scroll of a twin-scroll exhaust turbine. This criterion may be considered along with other engine system conditions such as NVH conditions and turbine temperature, and a final pattern may be selected based on a weighting of these factors.

In the case of a turbocharger system with a multi-scroll turbine such as in engine system 300, a distribution of exhaust gas that is concentrated on one scroll may improve turbine efficiency. This is because the lower exhaust volumes associated with deactivated cylinders may not provide enough power to each scroll for the turbine to operate efficiently if distributed among the plurality of scrolls. Concentrating the exhaust on one scroll may provide enough exhaust for efficient operation of that scroll, and may allow for a quicker response to a high boost demand in the event that the engine resumes firing of all cylinders.

The scroll toward which exhaust flow is concentrated may be selected based on several factors, including boost demand, scroll location (e.g., inner or outer scroll), scroll coupling (e.g., which cylinder(s) or cylinder bank the scroll is configured to receive exhaust from), scroll temperature, turbine speed, and turbine temperature, at the time of cylinder deactivation. As an example, the selecting may include selecting a first, higher flow scroll when the exhaust turbine speed at a time of receiving the boost demand is higher, and selecting a second, lower flow scroll when the exhaust turbine speed at the time of receiving the boost demand is lower. In an alternate example, wherein the boost demand includes a predicted boost demand, the selecting includes selecting the first, higher flow scroll and concentrating the exhaust to the higher flow scroll when the predicted boost demand is lower, and selecting the second, lower flow scroll and concentrating exhaust to the lower flow scroll when the predicted boost demand is higher. Herein, the higher flow scroll may one of two side-by-side scrolls coupled to distinct cylinders of a divided exhaust manifold while the lower flow scroll may be the other of the two scrolls. The two side-by-side scrolls may be coupled via a communication valve to allow for higher power output. In another example, the higher flow scroll may be one of an inner scroll and outer scroll, while the lower flow scroll may be the other of the inner and outer scroll. In the case of any asymmetric scroll, the scroll selection may be based on scroll temperature.

Selecting the scroll may also include adjusting the position of a scroll valve configured to direct exhaust flow to or between the scrolls. Thus, a cylinder pattern that deactivates cylinders connected to one scroll but keeps cylinders connected to the other scroll active may provide greater turbine efficiency compared to a cylinder pattern that deactivates cylinders coupled to both scrolls. In some examples, the multi-scroll turbine may be one of a plurality of multi-scroll turbines included in the boosted engine system, and a pattern may be selected which directs exhaust flow toward one of the plurality of multi-scroll turbines. The turbine may be selected based on one or more of turbine temperature, and turbine speed. For example, the turbine with the lower temperature and/or higher turbine speed may be selected.

As two non-limiting examples, the pattern chosen may be pattern A of FIG. 6 in the case of an in-line 4 cylinder engine, or alternatively pattern A' of FIG. 6 in the case of a V-8 engine.

Routine 820 comprises, at 822, selecting a pattern from the modified set of cylinder patterns wherein exhaust pulses from active cylinders are directed to each of a plurality of turbines at a rate that is at or above a desired frequency. In other words, the selected cylinder pattern may distribute exhaust pulses from active cylinders to each turbine at a determined frequency. This criterion may be considered along with other engine system metrics such as NVH conditions and turbine temperature, and a final pattern may be chosen based on a weighting of these factors.

In one example, in response to boost demand, routine 820 may be executed by controller 12 of twin-turbo system 400 wherein the first turbine is coupled to a first compressor and the second turbine is coupled to a second compressor, the first and second compressors directing boosted aircharge to a compressor outlet. In this example, a distribution of exhaust gas that directs exhaust to each of the first and second turbines at or above a desired frequency may improve turbine efficiency. In the specific configuration depicted in FIG. 4, each cylinder bank 413, 415 respectively directs exhaust toward turbines 424, 434, and selecting a cylinder pattern which includes the firing of cylinders on each bank at the determined frequency may improve turbine efficiency. This is because long delays between consecutive exhaust pulses received in a given turbine can slow down the turbine and cause compressor surge. By providing exhaust pulses to both turbines frequently, turbine speeds of both turbines can be maintained above a threshold that is based on the compressor surge line. Thus, a cylinder pattern that fires cylinders connected to each of the turbines at a rate above the desired frequency may provide greater turbine efficiency than a pattern that fires cylinders connected to both of the turbines at a rate below the desired frequency, or to only one turbine. If each of the turbines in the twin-turbo engine system is a multi-scroll turbine, the cylinder pattern selection may further factor in scroll locations. For example, a pattern may be selected which directs exhaust gas into only one scroll of each turbine at the desired frequency. The particular scrolls may be selected based on one or more of turbine speed, turbine temperature, and boost demand.

As two non-limiting examples, the pattern chosen may be pattern B of FIG. 6 in the case of an in-line 4-cylinder engine, or alternatively pattern B' of FIG. 6 in the case of a V-8 engine.

Routine 830 comprises, at 832, selecting a pattern from the modified set of cylinder patterns wherein exhaust pulses of firing cylinders are concentrated on only one of two turbines of a twin-turbo system. This criterion may be considered along with other engine system metrics such as NVH conditions and turbine temperature, and a final pattern may be chosen based on a weighting of these factors.

In one example, in response to boost demand, routine 830 may be executed by controller 12 of twin-turbo system 500 wherein the first turbine is coupled to a first compressor and the second turbine is coupled to a second compressor, the first and second compressors having distinct compressor outlets. In such a system, a distribution of exhaust gas that is directed into only one of the two turbines may improve turbine efficiency. This is because the lower exhaust volumes associated with deactivated cylinders may not provide enough power to either turbine for the turbines to operate efficiently if distributed evenly between two turbines. Concentrating the exhaust on one turbine may provide enough exhaust for efficient operation of one turbine, and may allow for a quicker response to a high boost demand in the event that the engine resumes firing of all cylinders. It will be appreciated that such an exhaust distribution may also improve turbine efficiency in a turbo system with more than two turbines and distinct compressor outlets.

For the example engine system 500 with twin turbochargers 520, 530, distinct compressor outlets 546, 548, and two cylinder banks 513 and 515 that respectively direct exhaust toward turbines 524 and 534, a cylinder pattern which concentrates firing on cylinders of a common bank, while selectively deactivating a number of other cylinders, may direct exhaust flow from active cylinders into only one of the two turbines. Concentrating exhaust flow on only one of the two turbines may improve the efficiency of that turbine. It will be appreciated, however, that alternate engine configurations may present other exhaust systems, and alternative methods to distribute exhaust flow to both turbines may be used. For example, only a specific set of cylinders on each bank of a V-8 engine may lead to each turbine, rather than all 4 cylinders on each bank. Thus a cylinder pattern which concentrates firing cylinders which lead to a first turbine and not to a second turbine, while selectively deactivating a number of cylinders which lead to the second turbine may improve turbocharger efficiency.

The turbine toward which exhaust flow is concentrated may be selected based on several factors including turbine speed, and turbine temperature at the time of cylinder deactivation. For example, a turbine having a lower temperature than other turbine(s) may be selected. In another example, a turbine having a higher speed than other turbine(s) may be selected. Thus, a cylinder pattern that deactivates all cylinders connected to one of the turbines but keeps all cylinders connected to the other turbine active may provide greater turbine efficiency compared to a cylinder pattern that fires cylinders to both turbines. In another example, a first number of cylinders connected to a first turbine may be active, and a second number of cylinders connected to a second turbine may be active, the first number larger than the second. If each of the turbines in the twin-turbo engine system is a multi-scroll turbine, the cylinder pattern selection may further factor in scroll location so that exhaust is directed to only one scroll of the selected turbine. The particular scroll may be selected based on one or more of turbine speed and boost demand.

As one example, the pattern chosen may be pattern C of FIG. 6 in the case of an in-line 4-cylinder engine, or alternatively pattern C' of FIG. 6 in the case of a V-8 engine.

In a further representation, a method for a boosted engine comprises: deactivating a first cylinder pattern of individual cylinder valve mechanisms based on driver demand; and in response to a tip-in, selectively transitioning to a second, different, cylinder pattern of individual cylinder valve mechanisms, the second pattern based on turbine speed at the tip-in. Further, the tip-in may be a tip-in to wide-open throttle. In another example, the transitioning may be based on a difference between turbine speed at tip-in and turbine speed corresponding to boost demand being higher than a threshold, while maintaining the first pattern may be based on the difference being lower than the threshold. The selective deactivation of the cylinders may include disabling the actuation of intake and exhaust valves, the fuel delivery mechanism, and the spark plug of specific cylinders while maintaining the actuation of intake and exhaust valves, the fuel delivery mechanism, and spark plug of other cylinders via an engine controller.

In a further representation, a method for a boosted engine comprises: in response to an increase in boost pressure, selectively deactivating one or more individual cylinders according to a cylinder pattern, the cylinder pattern adjusted based on a firing order of active cylinders and turbine speed. In one example, the selective deactivation may be in response to an increase in boost pressure from a value below an upper threshold to a higher value still below the upper threshold. The cylinder pattern may be chosen based on the associated distribution of exhaust gas flow. In one example, a cylinder pattern may be chosen which adjusts the firing order of cylinders to direct exhaust gas flow toward only one scroll of a twin-scroll turbine, the particular scroll chosen based on various engine conditions including scroll speeds and turbine temperature, while selectively deactivating cylinders which lead to the other scroll of the twin-scroll turbine. In an alternate example, a cylinder pattern may be chosen which adjusts the firing order of cylinders to direct exhaust gas flow toward only one turbine of a twin-turbo engine system, the particular turbine determined based on various engine conditions including turbine speeds and turbine temperatures, while selectively deactivating cylinders which lead to the other turbine of the twin-turbo system. In a another alternate example, a cylinder pattern may be chosen which adjusts the firing order of cylinders to direct exhaust gas flow toward both turbines of a twin-turbo engine system at a rate higher than a chosen frequency, the chosen frequency based on specific turbine properties. In still another alternate example, a cylinder pattern may be chosen which adjusts the firing order of cylinders to direct exhaust gas flow toward only one scroll of only a first turbine in a twin-turbo engine with one or more twin-scroll turbines, the specific turbine and specific scroll determined based on various engine conditions including turbine speeds, scroll speeds, and turbine temperatures, while selectively deactivating cylinders which lead to a second scroll of the first turbine and cylinders which lead to either scroll of the second turbine.

In this way, the technical effect of selecting cylinder patterns based on turbocharger performance at low-to-mid boost demand is that turbocharger performance may be enhanced despite low exhaust volumes. By selecting cylinder deactivation patterns that concentrate active cylinder exhaust pulses towards a single scroll of a multi-scroll turbine, and/or a single turbine of a twin-turbo engine, a turbine speed may be maintained at a sufficient level to provide low-to-mid boost. By maintaining sufficient turbine speed, turbocharger response to a high boost demand may be improved while reducing turbo lag. Alternatively, by selecting a cylinder pattern that evenly distributes exhaust pulses between turbines at a high frequency, the turbine speed may be disallowed from reaching slower speeds, reducing the likelihood of compressor surge. Overall, cylinder deactivation benefits, such as improved fuel economy, can be extended to a wider range of boosted engine operating conditions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine system, comprising:
in response to boost demand,
selectively deactivating cylinders by deactivating individual cylinder valve mechanisms to provide a cylinder pattern for selective cylinder deactivation, the cylinder pattern selected to direct exhaust from active cylinders into one of a plurality of engine turbines of turbochargers, the cylinder pattern selected to include a total number of deactivated/active cylinders, the deactivated engine cylinders selected based on their firing order, and selecting the one of the plurality of engine turbines based on turbine temperature.

2. The method of claim 1, wherein the one of the plurality of engine turbines is a first turbine coupled to a first compressor, the engine system further including a second turbine coupled to a second compressor, the first and second compressors having distinct compressor outlets.

3. The method of claim 2, wherein the boost demand includes a boost demand lower than a threshold boost pressure.

4. The method of claim 3, further comprising, in response to a boost demand higher than the threshold boost pressure, operating the engine system with all engine cylinders active.

5. The method of claim 1, wherein the selecting the one of the plurality of engine turbines includes selecting a turbine having a lower turbine temperature than the other turbines.

6. The method of claim 1, further comprising selecting the one of the plurality of engine turbines based on turbine speed, where a turbine with a higher speed is selected.

7. A method, comprising:
in response to a boost demand,
selectively deactivating cylinders by deactivating individual cylinder valve mechanisms to provide a cylinder pattern for selective cylinder deactivation, the cylinder pattern selected to direct exhaust from active cylinders into each of a first turbine and a second turbine, wherein the cylinder pattern does not include consecutive deactivated cylinders feeding the same turbine, the cylinder pattern selected to include a total number of deactivated/active cylinders, the deactivated engine cylinders selected based on their firing order.

8. The method of claim 7, wherein the first turbine is coupled to a first compressor and the second turbine is coupled to a second compressor, and wherein the first and second compressors direct boosted air charge to a common intake manifold of the cylinders.

9. The method of claim 7, wherein the cylinder pattern for an engine with a firing order of 15426378 is 15x2xx7x15x2xx7x.

10. The method of claim 7, wherein the cylinder pattern for an engine with a firing order of 134213421342 is 1x42x34x13x2.

* * * * *